July 28, 1970     D. J. HOLSINGER ETAL     3,521,781
ANTI-ROLLBACK MECHANISM
Filed Sept. 26, 1968     4 Sheets-Sheet 1
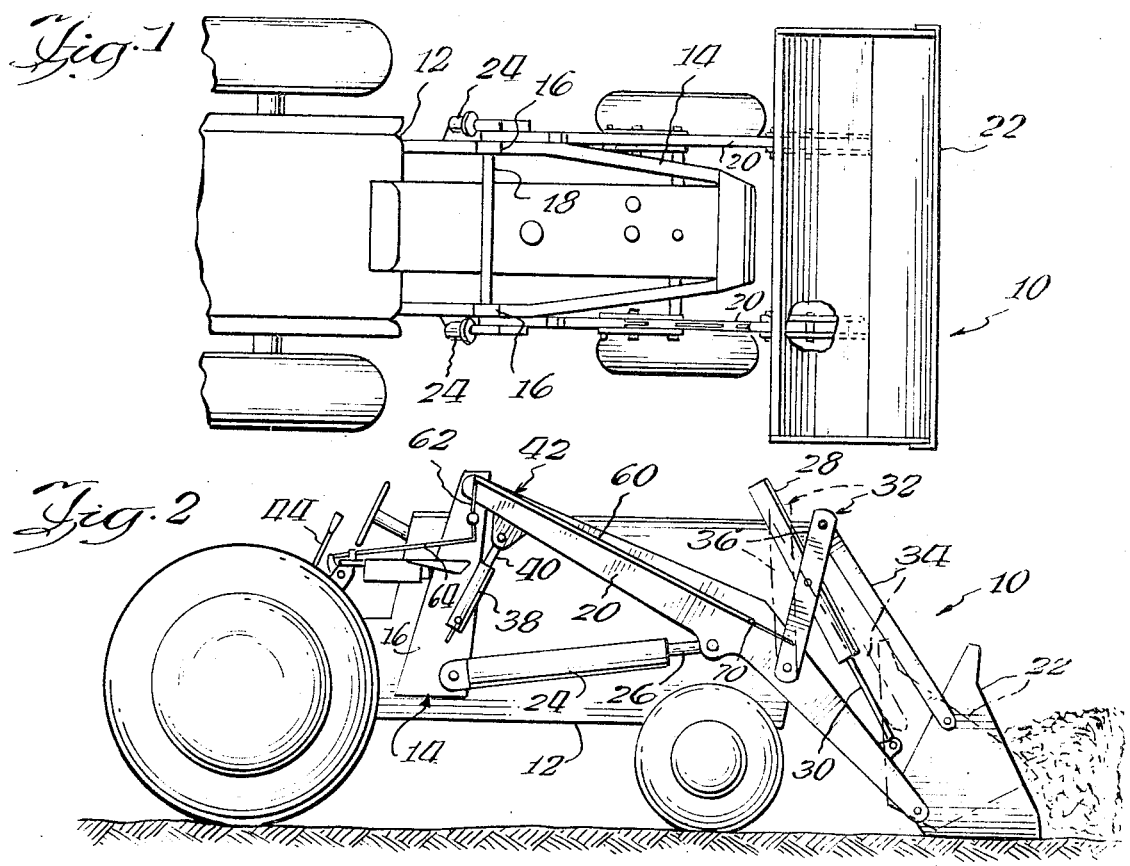
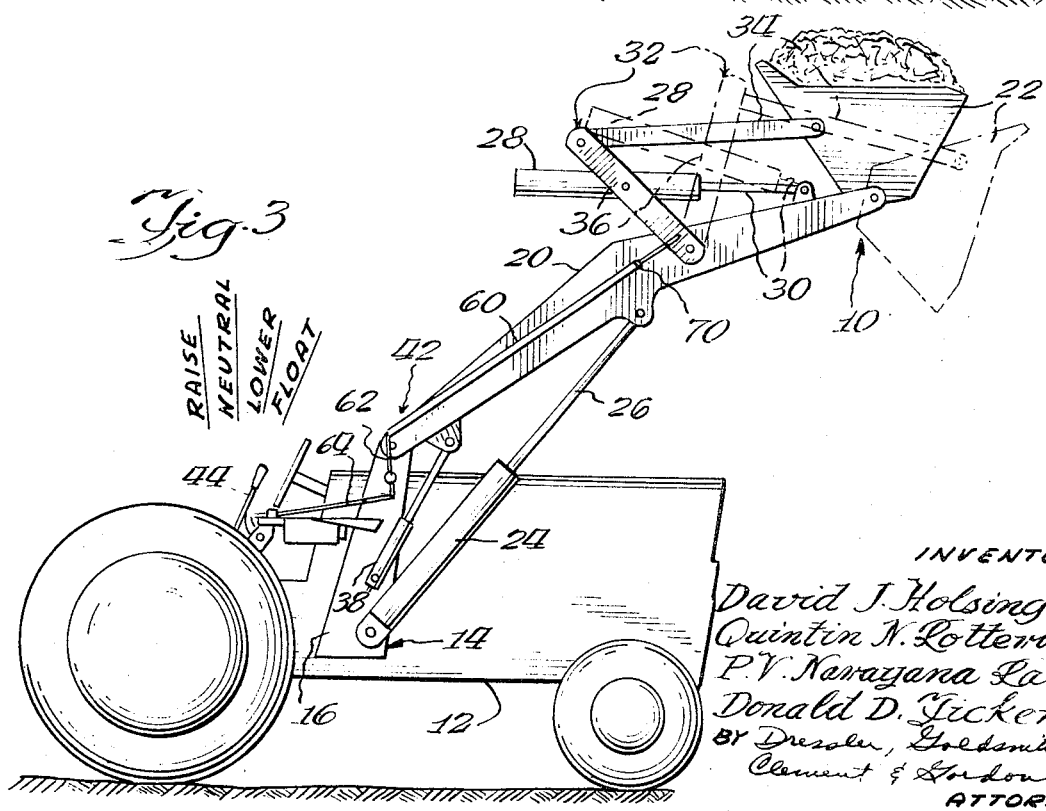
INVENTORS:
David J. Holsinger
Quintin N. Lottering
P. V. Narayana Rao
Donald D. Ficken
BY Dressler, Goldsmith Clement & Gordon
ATTORNEYS July 28, 1970 D. J. HOLSINGER ETAL 3,521,781
ANTI-ROLLBACK MECHANISM
Filed Sept. 26, 1968 4 Sheets-Sheet 2
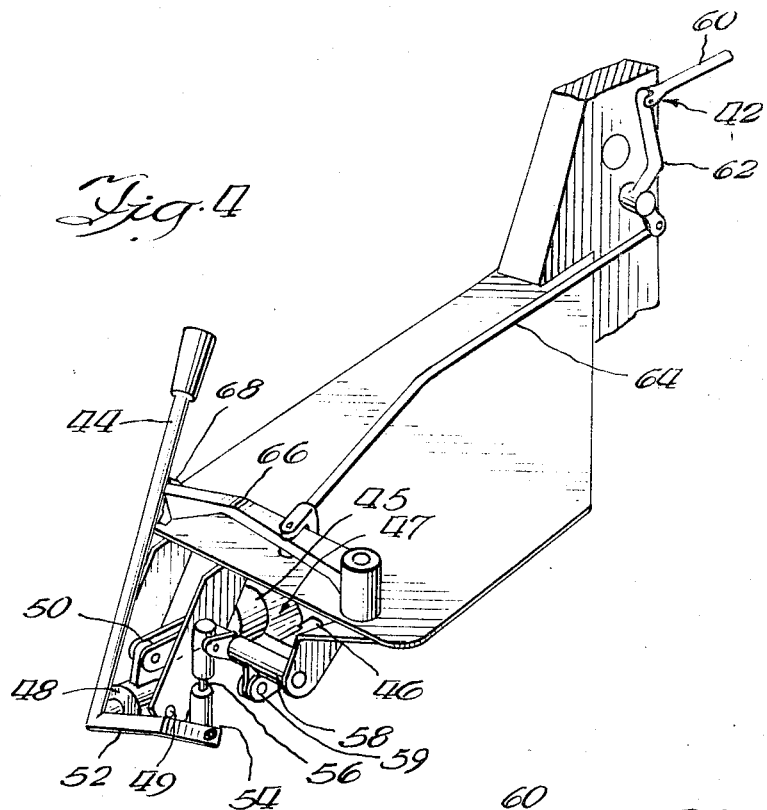
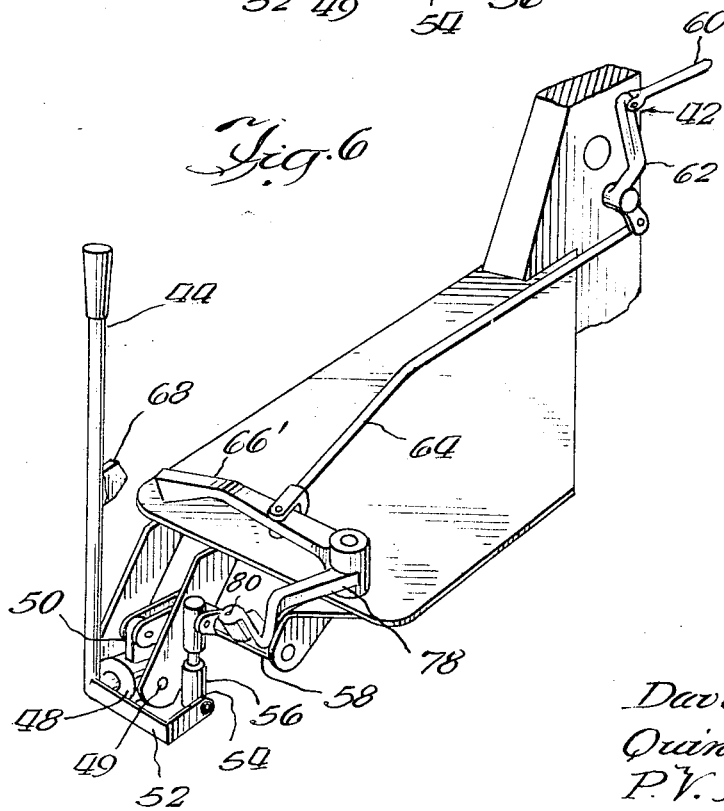
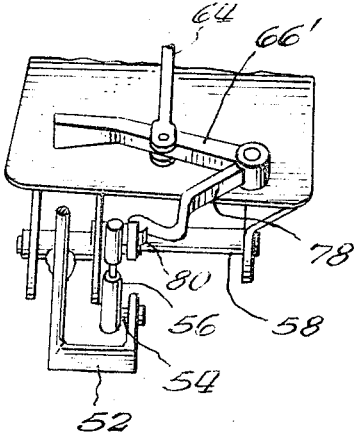
INVENTORS
David J. Holsinger
Quintin N. Rottering
P. V. Narayana Rao
Donald D. Ficken
BY Dressler, Goldsmith, Clement & Gordon
ATTORNEYS

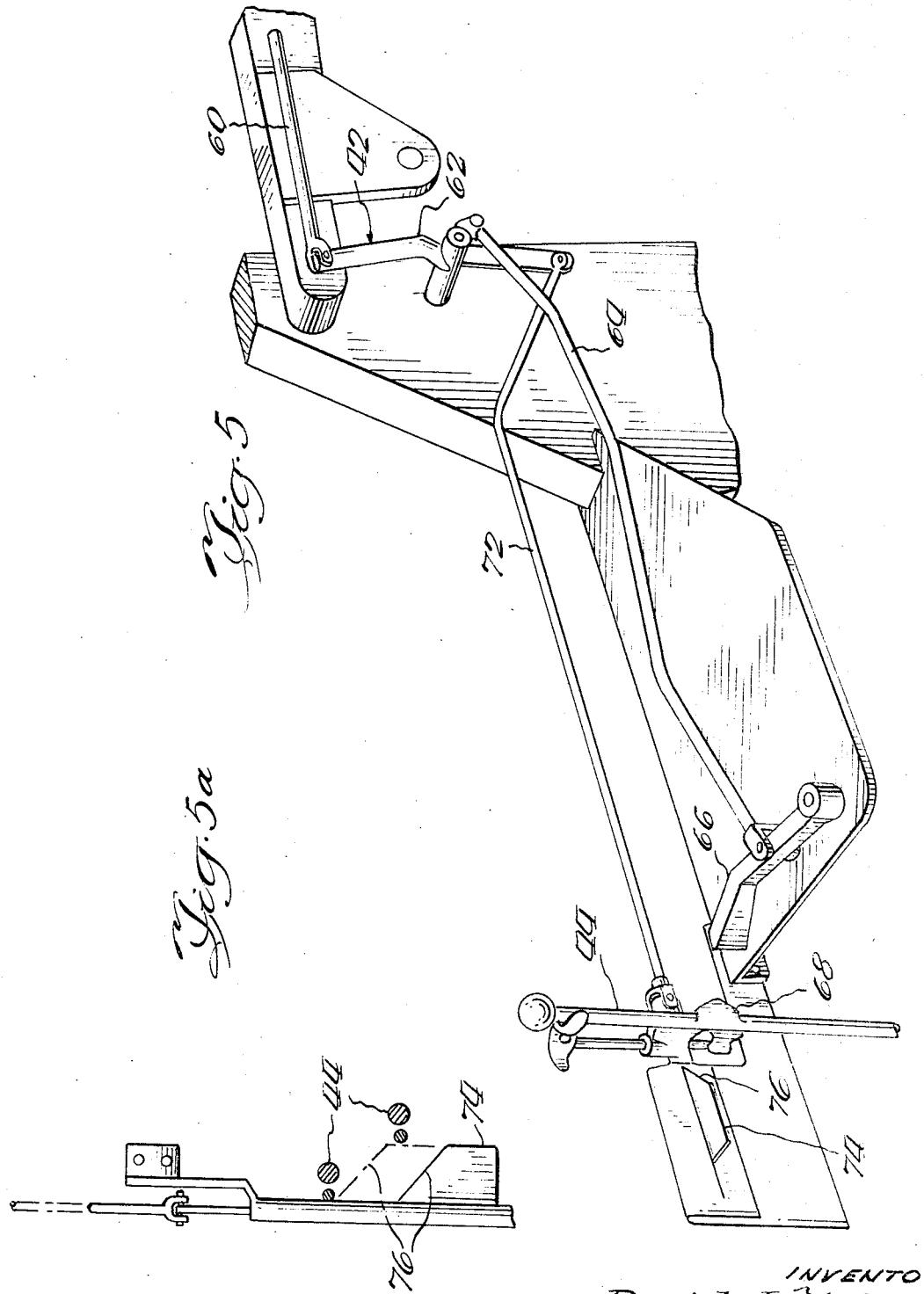

July 28, 1970 D. J. HOLSINGER ETAL 3,521,781
ANTI-ROLLBACK MECHANISM
Filed Sept. 26, 1968 4 Sheets-Sheet 1
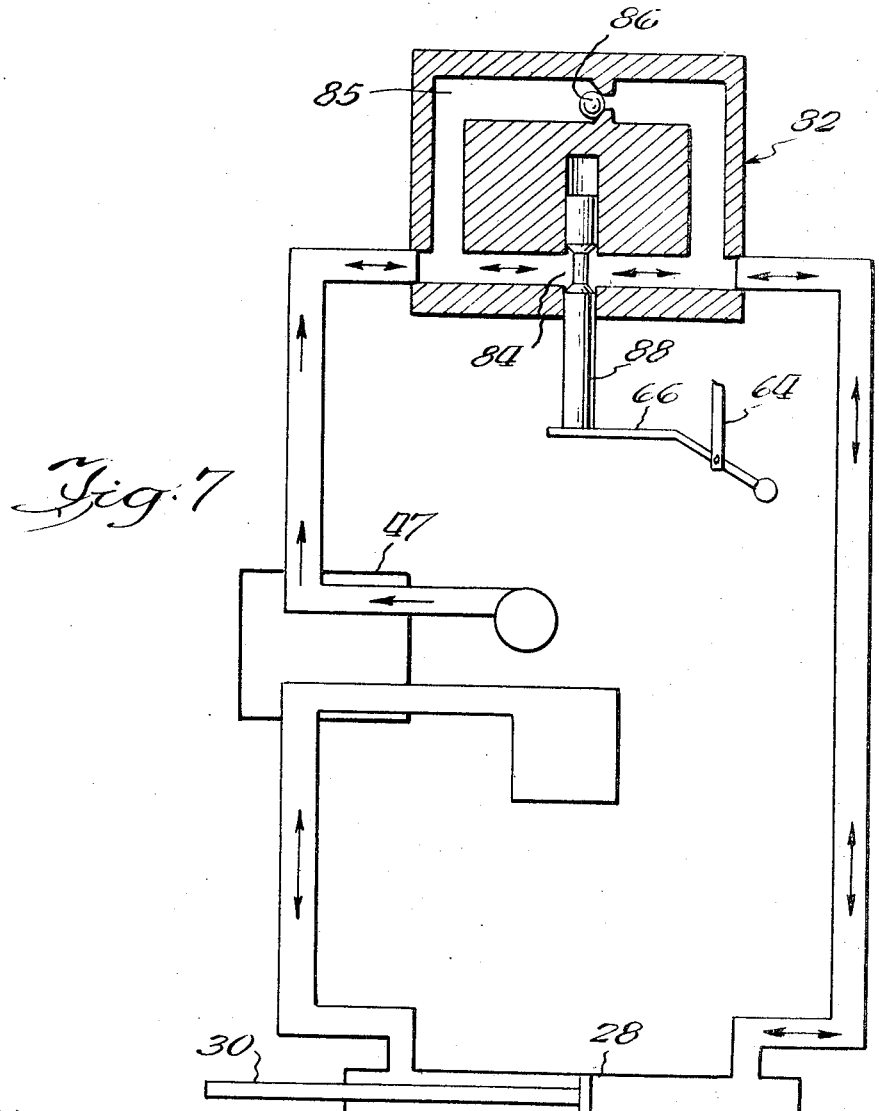
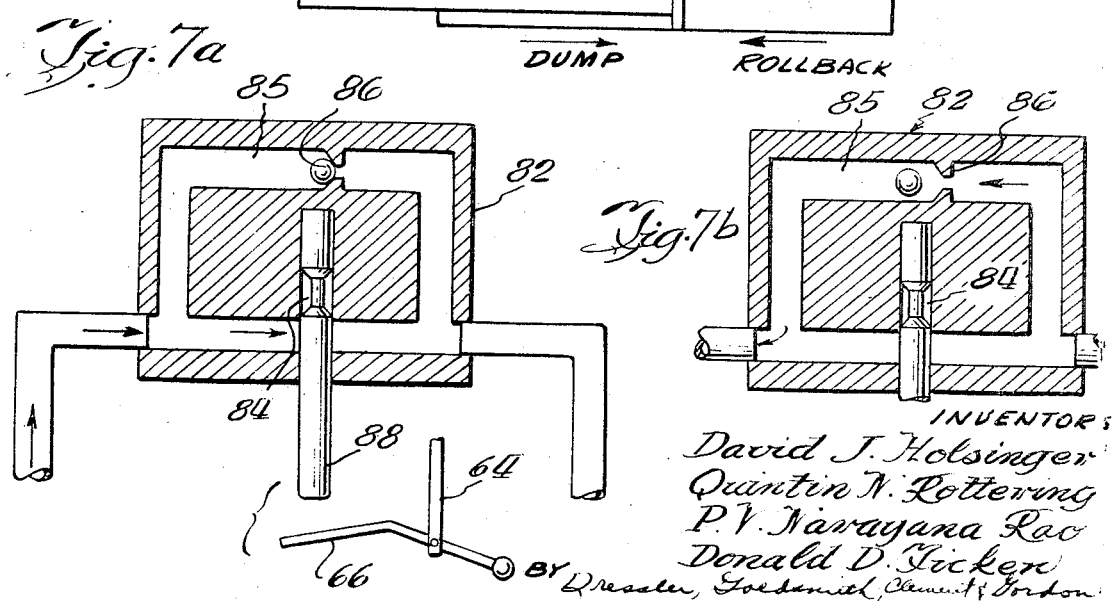

United States Patent Office 3,521,781
Patented July 28, 1970

3,521,781
ANTI-ROLLBACK MECHANISM
David J. Holsinger, El Segundo, Calif., Quintin N. Rottering, Newton, Iowa, Pinnamaneni Venkata Narayana Rao, Bapatla, Andhra Pradesh, India, and Donald D. Ficken, Dallas, Tex., assignors to J. I. Case Company, a corporation of Wisconsin
Filed Sept. 26, 1968, Ser. No. 764,373
Int. Cl. E02f 3/28
U.S. Cl. 214—764                                   13 Claims

ABSTRACT OF THE DISCLOSURE

A loader unit mounted on a tractor and including pivotally mounted lift arms pivotally carrying a bucket and all controlled by a hydraulic circuit including a lift arm control cylinder and a bucket control cylinder. The hydraulic control circuit incorporates a lift arm control valve spool and a bucket control valve spool operable by a single control lever. The loader unit also includes a mechanical return to dig linkage having a latch engageable with the single control lever to hold said lever in bucket rollback position to roll back the bucket into a dig position as said arm is lowered and further includes means coupled to the return to dig mechanical linkage for preventing movement of said lever into the bucket rollback position when the bucket and arm is in position to permit rearward dumping of the bucket.

BACKGROUND OF THE INVENTION

Material handling devices, such as loaders mounted upon and controlled by various vehicles, are well known. Such loaders include a lift arm pivotally mounted on the vehicle, which lift arm carries a pivotally mounted bucket at its free end. A hydraulic lift cylinder is connected between the vehicle or support thereon and lift arm to raise and lower the lift arm. Another bucket hydraulic cylinder is connected between the lift arm and the bucket to position the bucket relative to the lift arm.

A slave cylinder is provided to modify the action of the bucket cylinder in accordance with swinging movement of the lift arm for maintaining the bucket in a substantially level position. A typical self-leveling arrangement of this type is shown in Long U.S. Pat. No. 3,220,580.

Such arrangements are subject to rearward dumping of the bucket in the event of operator error. When the lift arms are in a raised or dump position, such rearward dumping of the bucket may present a substantially danger to the operator. There is a requirement and a serious need for some modification which can be made to existing material handling devices to introduce the necessary safety factor and prevent the possibility that the bucket might inadvertently be actuated in a fashion to cause rearward dumping over the operator when the lift arms are raised.

SUMMARY OF THE INVENTION

The present invention is directed to a positive anti-rollback mechanism which is designed for coupling with mechanical return to dig linkages in material handling devices incorporating a single control lever for operating both the lift arms and the bucket. In such a configuration, a typical mechanical return to dig linkage is provided and coupled between the bucket at one end and a return to dig latch at the other.

The operation of the return to dig linkage is governed both by the position of the bucket relative to the lift arm and by the position of the lift arm. When the lift arm is in a raised or dump position and the bucket has been dumped, the return to dig latch is in position to hold the control lever in "float" and rollback position until the lift arm has generally lowered and the bucket rolled back.

When the position of the bucket relative to the lowered lift arm is such that the bucket is in digging position, the return to dig latch automatically moves forward and releases the control lever allowing it to return to a neutral position relative to its bucket control function while allowing the lift arm to gradually settle into digging position under its own weight.

While it is desirable to automatically roll back the bucket under these conditions, it is undesirable to be able to roll back the bucket beyond a level position when the lift arm is raised since this would allow a load to be inadvertently dumped on the machine and, if the arms are high enough, onto the operator.

As explained above, the return to dig linkage and latch releases the control lever as the bucket rolls back into a dig position relative to the arms. This relationship can be utilized to prevent additional rollback of the bucket beyond its desired limit. Such anti-rollback mechanism can be incorporated as an additional mechanical member connected to the return to dig linkage and provided with means to positively prevent rollback of the bucket when the position of the return to dig linkage is such that the arms are raised and the bucket has rolled back.

In one embodiment, the anti-rollback mechanism includes a mechanical link, one end of which is connected to the return to dig linkage and the other end of which is disposed adjacent the control lever. When the bucket is rolled back, the return to dig linkage is so positioned that the anti-rollback link is moved alongside the lever to prevent its transverse movement into the bucket rollback control position.

Alternatively, the return to dig latch may be formed with an extension which engages a stop connected to the bucket control valve to prevent its actuation when the bucket has rolled back to a level position when the lift arm is raised.

In another embodiment, the return to dig latch may actuate a supplemental valve in the hydraulic circuit between the bucket control valve spool and the bucket control cylinder to prevent operation of the cylinder in the direction to effect rollback of the bucket past its level position. The supplemental valve includes a bypass to allow for dumping of the bucket even when the valve is closed. When the bucket is dumped or the lift arm is lowered, the supplemental valve is opened to allow for normal operation of the control lever and bucket control cylinder.

Numerous other advantages and features of the present invention will become readily apparent from the following detailed description of the invention and of one embodiment thereof, from the claims and from the accompanying drawings in which each and every detail shown is fully and completely disclosed as part of this specification, in which like reference numerals refer to like parts, and in which:

FIG. 1 is a plan view of a tractor with a loader mechanism mounted on the front end thereof;

FIG. 2 is a right side elevation of the loader, showing in solid lines the bucket in digging position and in dotted lines in lifting position;

FIG. 3 is a fragmentary view similar to FIG. 2, showing in solid lines the lift arm and bucket in fully raised position and in dotted lines the positions of the various components after the bucket has been dumped;

FIG. 4 is a perspective view of the return to dig latch in operative position;

FIG. 5 is a perspective view showing one embodiment of the anti-rollback mechanism connected to the return to dig linkage;

FIG. 5a is a diagrammatic plan view showing the relationship of the anti-rollback mechanism and the control lever that operates the lift arms and the bucket;

FIG. 6 is a diagrammatic view of another embodiment of the anti-rollback mechanism;

FIG. 6a shows the mechanism of FIG. 6 in engagement with a valve spool link;

FIG. 7 is a schematic diagram of a hydraulic control circuit for the bucket, including a supplemental valve to be actuated by the return to dig latch with the valve in the open position;

FIG. 7a shows the supplemental valve in the closed position to prevent bucket rollback; and FIG. 7b shows the supplemental valve in closed position with the release valve opened to allow for dumping of the bucket.

Referring now to FIGS. 1, 2 and 3, there is shown a material handling device which includes a loader mechanism 10 mounted on a front end of a tractor 12. The loader mechanism 10 includes a main frame 14 that is attached to the tractor 12 by any suitable means. The frame 14 serves as the main support member for the loader mechanism 10 and includes a pair of uprights 16 spaced on opposite sides of the tractor 12 and connected at their upper ends by a pivot shaft 18.

The loader mechanism consists of a pair of lift arms 20 pivotally connected to the upper end of the uprights 16 by the pivot shaft 18. A bucket 22 is pivotally connected to the forward ends of the lift arms 20.

Each lift arm 20 is pivoted about the pivot shaft 18 by operation of hydraulic cylinder 24 through the extension or retraction of a piston rod 26 extending outwardly from the cylinder 24. The lower end of each lift arm cylinder 24 is pivotally connected to the lower portion of one upright 16, while the outer end of the lift arm cylinder piston rod 26 is pivotally secured to an intermediate portion of the lift arm 20.

When hydraulic pressure is applied to the piston end of each hydraulic lift arm cylinder 24, the lift arm 20 and bucket 22 are raised by pivoting about the pivot shaft 18. Conversely, when pressure is applied to the rod end of the lift arm hydraulic cylinders 24, the lift arms 20 are pivoted in an opposite direction to lower the bucket 22 attached to the end of the arms.

The bucket 22 is pivoted relative to the lift arms 20 by a pair of hydraulic bucket cylinders 28, only one being shown in FIGS. 2 and 3. The piston rod 30 of each of the bucket cylinders 28 is connected to the respective lift arm 20 near the end thereof, while the bucket cylinder 28 itself is connected to the bucket 22 through a mechanical linkage 32. This bucket linkage 32 is identical for both lift arms 20, and therefore only one such arrangement will be described.

The bucket positioning linkage 32 includes a forward bucket link 34, one end of which is pivotally secured to the bucket 22 and the opposite end of which is pivotally connected to the end of a rear bucket link 36. The opposite end of the rear bucket link 36 is pivotally connected to an intermediate portion of the lift arm 20. It can thus be seen that pivotal movement of the rear bucket link 36 causes pivotal movement of the bucket 22 relative to the lift arm 20. The effectuate movement of the rear bucket link 36, the bucket hydraulic cylinder 28 is pivotally connected thereto intermediate its ends.

Application of hydraulic pressure to the rod end of the bucket cylinder 28 causes the bucket 22 to pivot forwardly relative to the arms 20 from a carry position wherein the top of the bucket is substantially level with the ground through a dig position into a dump position. Conversely, application of hydraulic pressure to the piston end of cylinder 28 causes the bucket 22 to pivot in a reverse direction from the dump position through the dig to the carry position. It is, of course, understood that the two bucket positioning linkages operate simultaneously to bring about the desired results.

It can be appreciated that when the lift arms 20 are raised, the bucket 22, if it remains in a fixed position relative to the arms 20, will tend to tilt rearwardly. If such were the case, when the lift arms 20 were raised, a load in the bucket 22 would be dumped back onto the tractor and onto the operator. A slave cylinder 38 connected between the lower region of one upright 16 and the rear end of one lift arm 20 provides self-leveling of the bucket 22 as the lift arms 20 are raised. The slave cylinder 38 is pivotally connected to the upright 16, while the piston rod 40 is pivotally connected to the lift arm 20. The piston end of the slave cylinder 38 is connected through a hydraulic line to the piston end of the bucket cylinders 28, while the rod end of the slave cylinder 38 is connected to the rod end of the bucket cylinders 28. The leveling action of the present arrangement is functionally similar to that shown in FIG. 2 of Long Pat. No. 3,220,580 with the exception that operation of the lift arm and bucket in the present arrangement is effected through a single control lever as will be explained below.

It may be seen that when the lift arms 20 are raised, the slave piston rod 40 is pulled upwardly to displace fluid from the rod end of the slave cylinder 38 through a hydraulic line to the rod end of bucket cylinder 28 to effectuate forward movement of the cylinder 28 concurrently with the upward swinging movement of the lift arms 20. This internal transfer of hydraulic fluid is accompanied by a corresponding flow of fluid from the piston end of the bucket cylinder 28 to the piston end of the slave cylinder 38.

The aforementioned retraction of the bucket cylinder 28 operates through the rear bucket link 36 and the forward bucket link 34 to cause forward swinging of the bucket 22 relative to the lift arms 20. Such forward tilting of the bucket 22 compensates for the tendency of the arcuate travel path of the lift arms 20 to cause progressive rearward tilting of the bucket 22. The ultimate result of these opposite actions is the maintenance of the bucket 22 in a level position as it is raised by the lift arms 20, thereby enabling the lift arms 20 to raise the bucket 22 to a maximum height while the load is maintained in the bucket without spilling out over the rear or front of the bucket.

This hydraulic self-leveling is achieved in both the present arrangement and in that of Long Pat. No. 3,220,-580. However, in the arrangement of Long Pat. No. 3,220,580, control of the hydraulic bucket cylinder may be effected independently of the position of the lift arms so that the bucket cylinder can be operated fully in either direction when the arms are in raised position. This allows, in the event of operator error, for the bucket to be tilted backwardly to dump the load back on the vehicle. This can be quite dangerous to the operator, particularly when large loads are being handled.

In accordance with the present invention, there is provided a mechanical interlock effective when the lift arms 20 are raised to prevent rearward tilting of the bucket 22 past its level position while permitting forward tilting of the bucket for dumping of the load. This anti-rollback interlock is effected in conjunction with a mechanical return to dig linkage 42 which operates to return the bucket 22 to digging position from dump position when the lift arms 20 are lowered.

As can be appreciated, when the bucket 22 is dumped with the lift arms 20 raised, the bucket 22 must be rolled back as the lift arms 20 are lowered in order that it achieve the digging position shown in FIG. 2. The return to dig linkage 42, designed for cooperation with a single control lever 44, operation of the lift arm and bucket hydraulic cylinders 24, 28, is shown in FIG. 3. The single control lever 44 enables an operator to actuate either or both of the lift arm hydraulic cylinder 24 and the bucket hydraulic cylinder 28.

Movement of the control lever 44 actuates two adjacent spools 45, 46 of a hydraulic control valve 47, each respectively controlling operation of the lift arm and bucket control cylinders 24, 28. Thus, for example, movement of the control lever 44 longitudinally of the tractor 12 on which it is mounted, in a direction parallel to the spool travel, actuates only the lift arm valve spool 45, while transverse movement of the control lever 44, movement perpendicular to spool travel, actuates only the valve spool 46 controlling the hydraulic bucket cylinder 28. Longitudinal and transverse movement of the control lever 44 actuates both lift arm and bucket cylinders 24, 28, respectively.

Pulling the control lever 44 to the rear raises the lift arms 20, moving the control lever 44 forward lowers the lift arms 20 and pushing the control lever 44 all the way forward into a detent float position allows the lift arms 20 to lower under its own weight. Transverse movement of the control lever 44 to the left rolls back the bucket 22 relative to the arms 20, while transverse movement of the control lever 44 to the right tilts the bucket 22 forward.

This results from the arrangement of the pivotal connections between the control lever 44 and the lift arm and bucket control valve spools 45, 46, respectively. The lower end of the control lever 44 is transversely pivotally mounted in a pivot block 48. The pivot block 48 is rotatably supported on a transverse pin 49 thereby allowing longitudinal movement of the control lever 44. A lug 50 provided on the top of the pivot block 48 is connected to the lift arm control spool 45, and therefore, when the control lever 44 is moved longitudinally, the lift arm control spool 45 is operated.

The control lever 44 is provided with a laterally extending L-shape extension 52 which terminates in a lower ball joint 54 which is suitably located to remain stationary when the control lever 44 is moved longitudinally. Since the ball joint 54 is located to one side of the pivot block 48, it is raised and lowered during transverse movement of the control lever 44. The lower ball joint 54 is connected through a vertical bucket control link 56 and a transverse bucket control link 58 to the bucket control spool 46 through the pivotal connection at 59. Thus, when the lower ball joint 54 is raised and lowered during transverse movement of the control lever 44, the transverse bucket control link 58 is rotated, thereby operating the bucket control spool 46 to cause rearward and forward tilting of the bucket 22.

In order to effect automatic return to dig position of the bucket 22 as the lift arms 20 are lowered, a mechanical linkage 42 is coupled to the bucket 22. The linkage 42 consists of a push rod 60, which at one end is connected to the rear bucket link 36 and at the other end is connected to an intermediate link 62 pivotally supported on the upright 16. The other end of the intermediate link 62 is connected to a horizontal extension 64 which terminates in a pivotal connection with a return to dig latch 66. One end of the return to dig latch 66 is pivotally connected to the frame of the tractor 12 and the other end is free to move longitudinally of the apparatus in response to movement of the linkage 42.

When the bucket 22 is dumped, the push rod 60 is pulled forward thereby pushing the return to dig latch 66 rearwardly into a control lever holding position. When the control lever 44 is pushed forward into the float position, where it is held by a valve detent, and to the left into the bucket rollback position, it is held to the left by the end of the return to dig latch 66 which engages a lug 68 on the control lever 44.

During initial rollback of the bucket 22, the push rod 60 remains stationary since it includes a telescoping portion 70 which allows initial movement of the bucket 22 to occur without affecting the linkage 42. When the telescoping action of the push rod 60 is completed, the push rod 60 is moved rearwardly. This causes the horizontal extension 64 to move forwardly, pulling the return to dig latch 66 forward to release the control lever 44 from its rollback position. Since the bucket control spool 46 is biased to neutral, the control lever 44 automatically returns to bucket neutral position but remains in its lift arm float position due to the valve detent in the lift arm spool 45. The geometry of the lift arms 20 and linkage 42 is designed to automatically return the bucket 22 to dig position in cooperation with the slave cylinder 38 during the lowering cycle so that the bucket 22 is in dig position when the lift arms 20 are completely lowered.

From the above, it is clear that the position of the return to dig latch 66 is controlled both by the position of the bucket 22 relative to the lift arms 20 and by position of the lift arms 20. Thus, when the bucket 22 is rolled back to its level position, the return to dig latch 66 is pulled forward out of the way of the control lever 44. Making use of this relationship, it is possible to interfere with operation of the control lever 44 to prevent its operation to rollback the bucket 22 past its level position while the lift arms 20 are still raised thereby preventing accidental dumping of a load onto the operator.

Referring to FIGS. 5 and 5a, there is shown one embodiment of the present invention including an anti-rollback link 72 conected to the intermediate link 62 of the return to dig linkage 42. As the bucket 22 is rolled back, both the return to dig latch 66 and the anti-rollback link 72 are pulled forward. When the bucket 22 is rolled back to a point beyond which it is not safe to continue rollback, the end of the anti-rollback link 72, which is provided with a lateral flange 74, is moved alongside the control lever 44 to prevent its transverse movement into the rollback position. If by chance the rollback lever is maintained in this position, a tapered leading edge 76 of the lateral flange 74 forces the control lever 44 into neutral position.

Alternatively, as seen in FIGS. 6 and 6a, the anti-rollback function can be effected by providing an extension 78 as a part of the return to dig latch 66' extending readwardly from the latch pivot point. As the return to dig latch 66' is pulled forwardly to release the control lever 44, the extension 78 is moved over the transverse bucket control link 58. When in this position, the extension 78 engages a stop 80 formed on the transverse link 58 preventing further rotational movement of the link 58 and, in fact, forcing the link 58 to rotate rearwardly until the control lever 44 returns to the neutral position. This positively restrains the control lever 44 from operating the bucket control spool to roll back the bucket 22.

The return to dig latch can also be utilized to operate a supplemental hydraulic valve 82 connected in the hydraulic circuit between the bucket control valve and the bucket control cylinder 28. The supplemental valve 82 includes a valve 84 and a bypass 85 with a one-way check valve 86. The supplemental valve 82 is activated by the return to dig latch 66. As explained above, the position of the return to dig latch 66 is governed both by the position of the bucket 22 relative to the lift arms 20 and by the position of the lift arms 20. Thus, when the bucket 22 has rolled back to a point where it is substantially level, the return to dig latch 66 which releases the control lever 44 engages the operating mechanism 88 of the supplemental valve 82 to close the valve 84 and prevent additional rollback of the bucket 22 (FIG. 7a). Dumping of the bucket 22 is facilitated by bypassing the closed two-way valve 84 with a one-way check valve 86 which opens when hydraulic pressure is applied to dump the bucket 22 (FIG. 7b).

Thus, there has been disclosed mechanism for preventing rollback of a bucket in a material handling device past its level position when the lift arms are raised to thereby prevent readward dumping of a load in the bucket onto the operator. The anti-rollback mechanisms operate in conjunction with a mechanical return to dig linkage and a single control lever for hydraulic operation of both the lift arm and the bucket to positively interfere with the operation of the control lever into bucket rollback operating position.

It will be readily observed from the foregoing detailed description of the invention and in the illustrated embodiments thereof that numerous variations and modifications may be effected without departing from the true spirit and scope of the novel concepts and principles of this invention.

What is claimed is:

1. A material handling device comprising in combination pivotally mounted lift arm means, a bucket pivotally suported on said lift arm means, means for raising and lowering said lift arm means, means for rolling said bucket forward and back relative to said lift arm means, a control lever, means for coupling said control level to said lift arm raising and lowering means and to said bucket rolling means, whereby movement of said control lever causes both independent and joint operation thereof, latch means, a mechanical linkage including said latch means, means connecting one end of said linkage to said bucket for moving said latch means into engagement with said control lever when said lift arm means is raised and said bucket is in dump position to hold said control lever in bucket rollback position during downward movement of said lift arm means to return said bucket to dig position, and anti-rollback means connected to said mechanical linkage and responsive to the position thereof for interfering with the operation of said control lever to prevent its operation to roll back said bucket past its level position when said lift arm means is raised.

2. A material handling device in accordance with claim 1 wherein movement of said control lever in one direction causes rolling of the bucket back relative to said lift arm means, and in which said anti-rollback means is a link, and means connecting said link to said mechanical linkage for positioning said link adjacent to said control lever to prevent movement of said control lever in said one direction, whereby said rearward swinging movement of said bucket past its level position is prevented.

3. A material handling device in accordance with claim 2 including means for reciprocably mounting said link adjacent to said control lever, whereby movement of said mechanical linkage moves said link between a first control lever interfering position and a second noninterfering position.

4. A material handling device in accordance with claim 3 in which said reciprocable link is provided with an inclined surface positioned to engage said control lever when said control lever is moved in said one direction to cause rollback of said bucket to force said control lever to move in a direction opposite to said one direction upon movement of said link into said first control lever interfering position.

5. A material handling device in accordance with claim 1 wherein said anti-rollback means includes an extension formed as a part of said latch means.

6. A material handling device in accordance with claim 5 wherein said means for coupling said control lever to said bucket rolling means includes a control link, and further including a stop formed on said control link, whereby said stop is engaged by said latch extension to prevent rollback of said bucket past said level position when said lift arm means is raised.

7. An anti-rollback mechanism for a material handling device comprising a support structure, lift arm means pivotally mounted on said support structure, a bucket pivotally mounted on said lift arm means for rearward and forward swinging movement movement relative thereto, first hydraulic means connecting said first hydraulic means to said lift arm means and to said support structure for raising and lowering said lift arm means, second hydraulic means, means connecting said second hydraulic means to said lift arm means and to said bucket for swinging the bucket rearward and forward relative to said lift arm means, a first control valve, means for coupling said first control valve to said first hydraulic means, a second control valve, means for coupling said second control valve to said second hydraulic means, a single control lever, means connecting said control lever to said control valves for operating said first control valve to raise and lower said lift arm means upon movement of said control lever in a first direction, for operating said second control valve to swing said bucket upon movement of said lever in a second direction, and for operating both of said control valves upon combined movement of said lever in both said first and second directions, a mechanical linkage, means connecting one end of said linkage to said bucket and to said bucket hydraulic means, means pivotally connecting said linkage intermediate its ends to said support structure, a latch, means connecting said latch to said linkage, means for pivotally supporting said latch adjacent said control lever for movement in response to movement of said linkage between a first position, wherein said latch holds said control lever in bucket rollback operating position for causing rearward swinging movement of said bucket and a second position for releasing said control lever, and anti-rollback means coupled to said linkage for interfering with operation of said control lever when said latch is in said first position to prevent movement of said control lever into said bucket rollback operating position thereby preventing rearward swinging movement of said bucket past its level position when said lift arm means is raised.

8. A material handling device in accordance with claim 7 wherein said control lever interfering means includes a mechanical link, means connecting said link to said linkage adjacent its pivotal connection to said support structure, whereby said link engages said control lever to prevent its positioning into said bucket rollback operating position when said lift arm means is raised.

9. A material handling device in accordance with claim 7 including an extension formed as a part of said latch means, stop means formed as a part of said coupling means between said control lever and said second control valve, said extension being responsive to movement of said latch means to its second position to engage said stop means to prevent operation of said bucket control valve in one direction, whereby rearward swinging movement of said bucket past its level position is prevented when said lift arm means is raised.

10. A material handling device in accordance with claim 9 wherein said stop means is engaged by said extension when said control lever is in said bucket rollback operating position.

11. A material handling device in accordance with claim 10 in which said stop means is an upwardly extending projection formed as a part of the coupling means between said lever and said second valve, said stop being moved towards said extension upon movement of said lever into said bucket rollback operating position.

12. A material handling device in accordance with claim 7 wherein a supplemental control valve is disposed between said second control valve and said second hydraulic means, said supplemental control valve having switch means engageable by said latch means in its second position for closing said supplemental valve to prevent rearward swinging movement of said bucket past its level position when said lift arm means is raised.

13. A material handling device in accordance with claim 12 wherein said supplemental control valve includes means for allowing forward swinging movement of said bucket when said supplemental valve is open and when said supplemental valve is closed by actuation of said switch means.

References Cited

UNITED STATES PATENTS 3,432,057   3/1969   Goth _____ 214—764

HUGO O. SCHULZ, Primary Examiner